United States Patent
Guo et al.

(10) Patent No.: US 12,395,243 B2
(45) Date of Patent: Aug. 19, 2025

(54) FREE-SPACE OPTICAL LINK

(71) Applicants: Qingdong Guo, San Jose, CA (US);
Chunmeng Wu, Hayward, CA (US);
Zhigang Zhou, San Jose, CA (US);
Zining Huang, Fremont, CA (US);
Qinrong Yu, Fremont, CA (US);
Jiangqing Lei, Shenzhen (CN); Liang Chen, Shenzhen (CN); Zhipeng Zhao, Shenzhen (CN)

(72) Inventors: Qingdong Guo, San Jose, CA (US);
Chunmeng Wu, Hayward, CA (US);
Zhigang Zhou, San Jose, CA (US);
Zining Huang, Fremont, CA (US);
Qinrong Yu, Fremont, CA (US);
Jiangqing Lei, Shenzhen (CN); Liang Chen, Shenzhen (CN); Zhipeng Zhao, Shenzhen (CN)

(73) Assignee: O-NET (USA) Inc., San Jose, CA (US)

( * ) Notice: Subject to any disclaimer, the term of this patent is extended or adjusted under 35 U.S.C. 154(b) by 382 days.

(21) Appl. No.: 18/080,646

(22) Filed: Dec. 13, 2022

(65) Prior Publication Data
US 2024/0195501 A1   Jun. 13, 2024

(51) Int. Cl.
*H04B 10/00* (2013.01)
*H04B 10/114* (2013.01)
*H04B 10/50* (2013.01)
*H04J 14/00* (2006.01)

(52) U.S. Cl.
CPC ......... *H04B 10/114* (2013.01); *H04B 10/503* (2013.01)

(58) Field of Classification Search
CPC ... H04B 10/11; H04B 10/112; H04B 10/1123; H04B 10/1125; H04B 10/114; H04B 10/1143; H04B 10/116; H04B 10/118
See application file for complete search history.

(56) References Cited

U.S. PATENT DOCUMENTS

| | | |
|---|---|---|
| 10,931,374 B1 | 2/2021 | Sleator |
| 2012/0148245 A1* | 6/2012 | Bowler ............... H04J 14/0307 398/58 |
| 2018/0048390 A1* | 2/2018 | Palmer ................. H04B 7/0617 |
| 2021/0211331 A1* | 7/2021 | Pezeshki ............. H04B 10/502 |

\* cited by examiner

*Primary Examiner* — Daniel G Dobson
(74) *Attorney, Agent, or Firm* — PatentPC PowerPatent; Bao Tran

(57) ABSTRACT

The present application is directed a short distance free space optical communication link system. The system includes optical transmitter, receiver, beam expander, Rx lens and auxiliary alignment system.

19 Claims, 3 Drawing Sheets

FREE-SPACE OPTICAL LINK

BACKGROUND

Compared to radio frequency communication system, an optical communication system has wide transmission bandwidth and high speed. Traditional optical communication systems transmit laser beams through optical fibers, and such wired arrangement requires the transceiver devices positioned at both ends of the laid optical fiber to be relatively fixed. This will limit its application. For example, if the transmitter is in a moving object such as a smart car, the attached optical fiber will restrict the moving object.

With the development of AI, unmanned aerial vehicles (UAVs) and automatic driving technology, large amounts of data need to be uploaded and downloaded automatically between a data center and unmanned vehicles or moving bodies.

SUMMARY

The present application is directed a short distance free space optical communication link system. The system includes optical transmitter, receiver, beam expander, Rx lens and auxiliary tracking system.

In one aspect, a system includes a beamer that shapes the optical beam to transmit optical data over air; a transmitter coupled to the beamer; a tracking light source coupled to the beamer; wherein the beamer optically communicates with a receiver unit including a receiving lens and the received tracking light source is used to rotate the receiver unit in a two-dimensional rotating axis, the receiving lens focusing a received light to a receiver, wherein the receiver can be a photo-detector or a fiber pigtailed photo-detector.

The auxiliary tracking system and optical communication system share an optical system. An optical splitter to separator optical communication signal and tracking signal at the receiver side. The tracking beam was focused on COMS by receiving lens. The COMS can be moved in axially for accurate focus.

Implementations of the above aspect may include one or more of the following. A transceiver can be optically coupled to the photo-detector, wherein the beamer sends a command to the receiver to scan and calculate a beamer position base on an image of tracking light from the tracking light source and based on a beamer position, the receiver unit automatically points to the beamer to align tracking light to the reference point and once signal power reaches a predetermined threshold, the transceiver sends a communication signal. The communication signal can be used for precision during an alignment process. The beamer can include a fiber pigtail, lens, or/and prism. The beamer function is to make a properly diverged transmitted beam to enhance the power received by the receiver and reduce receiver alignment tolerance. The transmitter and receiver can be auto-aligned for some short-distance applications. The receiver unit consists of a receiving lens (Rx lens), a position detector, a fiber pigtail and/or a photodetector. A PSD or CMOS detector can locate the tracking beam. The receiving unit can have multi-division adjustment capability by optical Mux/DMux. The Rx lens couples the transmission signals into a multimode fiber. The signal from the multimode fiber is then coupled into the photodiode, so signal power at the receiver side can be higher than the signal power from Rx lens directly coupled into the photodiode for high modulation speed communication. For low modulation speed communication, the Rx lens directly couples transmission signals into a photodiode.

In another aspect, a beam expander, described here consists of a fiber pigtail, lens or/and prism. The function is to make a properly diverged transmitted beam to enhance the power received by the receiver and reduce receiver alignment tolerance. The transmitter and receiver can be passively or actively aligned for some short-distancapplicationson. The laser can also be integrated with a beam expander together to eliminate fiber connections.

For high-speed fiber optic communication, the signal can be transmitted from one end of the fiber to another end. The Rx lens couples the transmission signals into the photodiode directly at the receiver side and eliminates the fiber connection between the transmitter and receiver. The Rx lens optical design can be based on the parameters of the shaped beam from the transmitter, the system working distance, beam pointing tolerances, among others.

The present system advantageously enables free space communication from one point to another point. For example, the system provides high-speed optical communication between mobile vehicles/robots and a fixed data center. Air is used as an optical transmission medium to realize short-distance point-to-point optical communication. The position of the two points is fixed or the relative movement is minimal. In the implementation, one end of the two ends of the communication can move or rotate within a certain range. Therefore the optical system of the present invention has a tracking and alignment function. In the present system, communication, tracking, and alignment use the same optical fiber optic system to ensure stable and reliable performance and a simple assembly process. The system can achieve the same communication rate as fiber optic communication system. In addition to the transmitter and receiver, a beamer is connected to the transmitter. The signal beam will be shaped by the beamer for free-space communication. On the receiver side, a large lens collects the optical signal and then focuses the signal into a large core fiber. The large core fiber will pass the signal into the regular receiver used in fiber optical communication.

Advantages of the preferred embodiment may include one or more of the following. The system provides high-speed, yet secure communication between moving vehicles and a base station. High speed is needed for autonomous navigation data communication that is wireless/cable-free and faster than 5G. The system can incorporate multiple optical transceivers. The optical transceivers can run at different wavelengths and can support data transmission at a high bit rate. One system can use one optical transceiver, or multiple systems can share one transceiver at a high aggregated bit rate. In this way, low-bit rate transmission can go through the conventional electrical connections, and high-bit rate transmission can go through the optical connections to avoid traffic jams or contention in the electrical switches. Further, when increased capacity is needed, additional high-speed optical transceivers at new wavelengths can be added and share the same lens. Since one lens can support a relatively large number of wavelengths, multiple systems can share one optical fiber through channel multiplexing using an optical power coupler.

The system can significantly improve the communication bandwidth of the existing networks. Once the optical circuit path is set up, a bit rate transparent communication pipe becomes available and the system is highly scalable. System upgrade and expansion can be achieved by adding additional wavelengths, instead of coaxial cables or optical fibers. The system is also fault tolerant: optical switching networks are used to off-load the heavy traffic and to provide additional communication channels. As a result, the system improves the fault tolerance of the whole network.

The use of multiple optical transceivers improves performance. The optical transceivers will run at different wavelengths and will support data transmission at a high bit rate. With the system, one single server can use one optical transceiver, or multiple servers can share one transceiver at a high aggregated bit rate. In this way, low-bit rate transmission can go through conventional electrical connections, and high-bit rate transmission can go through optical connections to avoid traffic jams or contention in the electrical switches. Further, when increased capacity is needed, additional lenses and optical transceivers at new wavelengths can be added to the system with channel multiplexing using an optical power coupler.

The optical switching unit is a fully functional sub-system to support multiple operations required by data networks at great flexibility. The incoming optical signals can be directed to a particular sub-system directly if the wavelength of the incoming signal matches one of the wavelengths of the optical transceivers on the destination sub-system. Otherwise optical wavelength conversion can be used. Once the optical circuit path is set up, a bit-rate transparent communication pipe becomes available.

BRIEF DESCRIPTION

The following detailed description of certain embodiments may be understood by reference to the following figures wherein.

DETAILED DESCRIPTION

Figure 1:
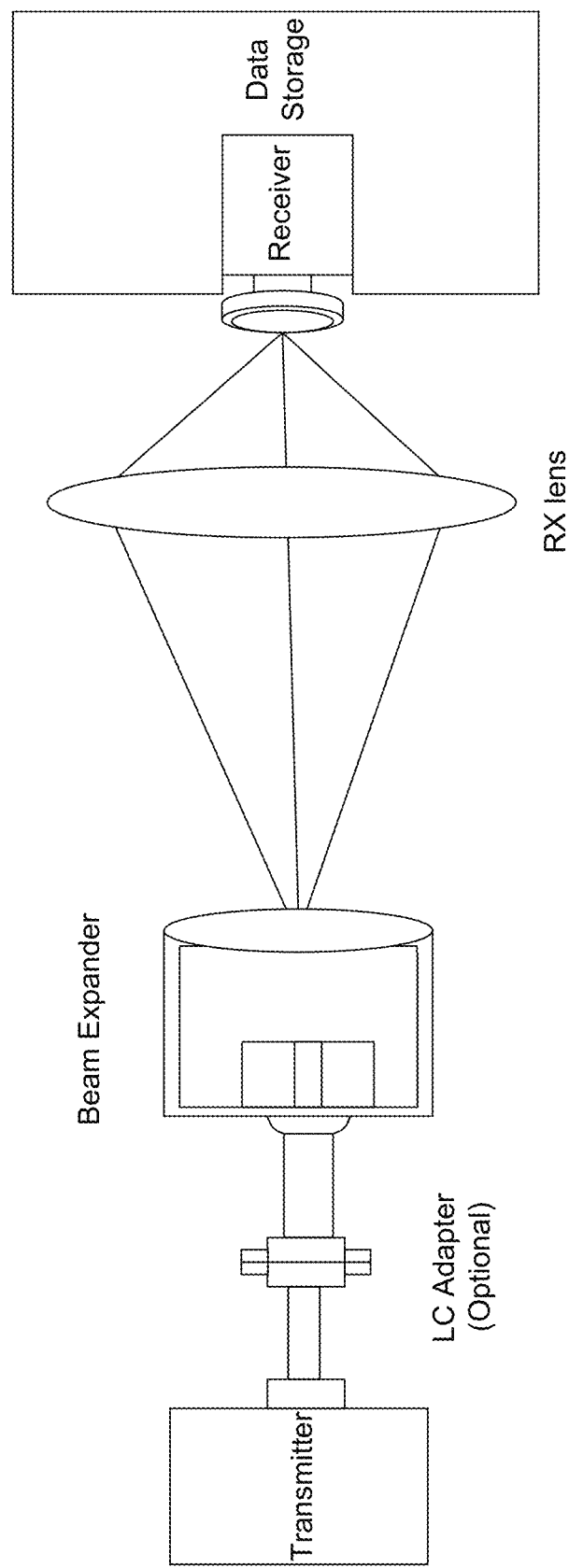
FIG. 1 shows an exemplary system to perform free space communications.

The following discussion describes in detail one embodiment of the invention (and several variations of that embodiment). This discussion should not be construed, however, as limiting the invention to those particular embodiments, practitioners skilled in the art will recognize numerous other embodiments as well. For a definition of the complete scope of the invention, the reader is directed to appended claims.

In the following paragraphs, the present invention will be described in detail by way of an example with reference to the attached drawings. Throughout this description, the preferred embodiment and examples shown should be considered to be exemplary, rather than limitations on the present invention. As used herein, the "present invention" refers to any one of the embodiments of the invention described herein and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein the same reference numerals are used to refer to the same elements throughout. In the following description, for purposes of explanation, numerous specific details are set forth to provide a thorough understanding of one or more embodiments. It may be evident, however, that such embodiment(s) may be practiced without these specific details. In other instances, well-known structures and devices are shown in block diagram form to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, and illustrations represent conceptual views or processes illustrating systems and methods embodying this invention. The functions of the various elements shown in the figures may be provided with dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 shows an exemplary system with an optical transmitter (Tx), an optical receiver (Rx), a beam expander, a receiving (Rx) lens, and an auxiliary alignment system. The function of the auxiliary alignment system is to make the transmitted light path align with the receiver so that the beam and receiver are in focus and the pointing error is minimized. The auxiliary alignment system can be automatically turned on to assist the alignment process. The divergence angle of the tracking beam should be big enough to ensure that the transmitter can be detected when the vehicle reaches a specific area. In other words, the tracking beam size at the receiver side should cover or partially cover receiving lens.

Figure 2:
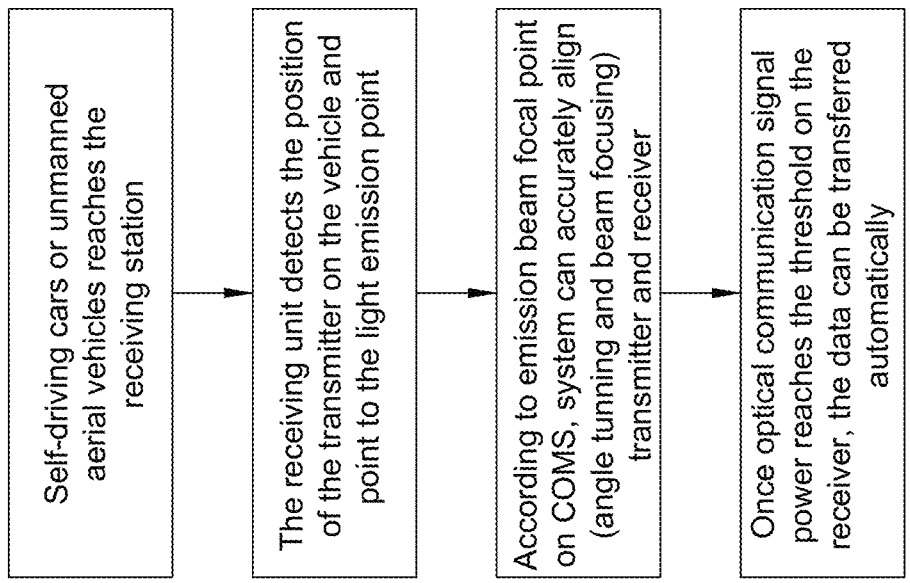
FIG. 2 shows an exemplary method to perform free space communications.
Figure 3:
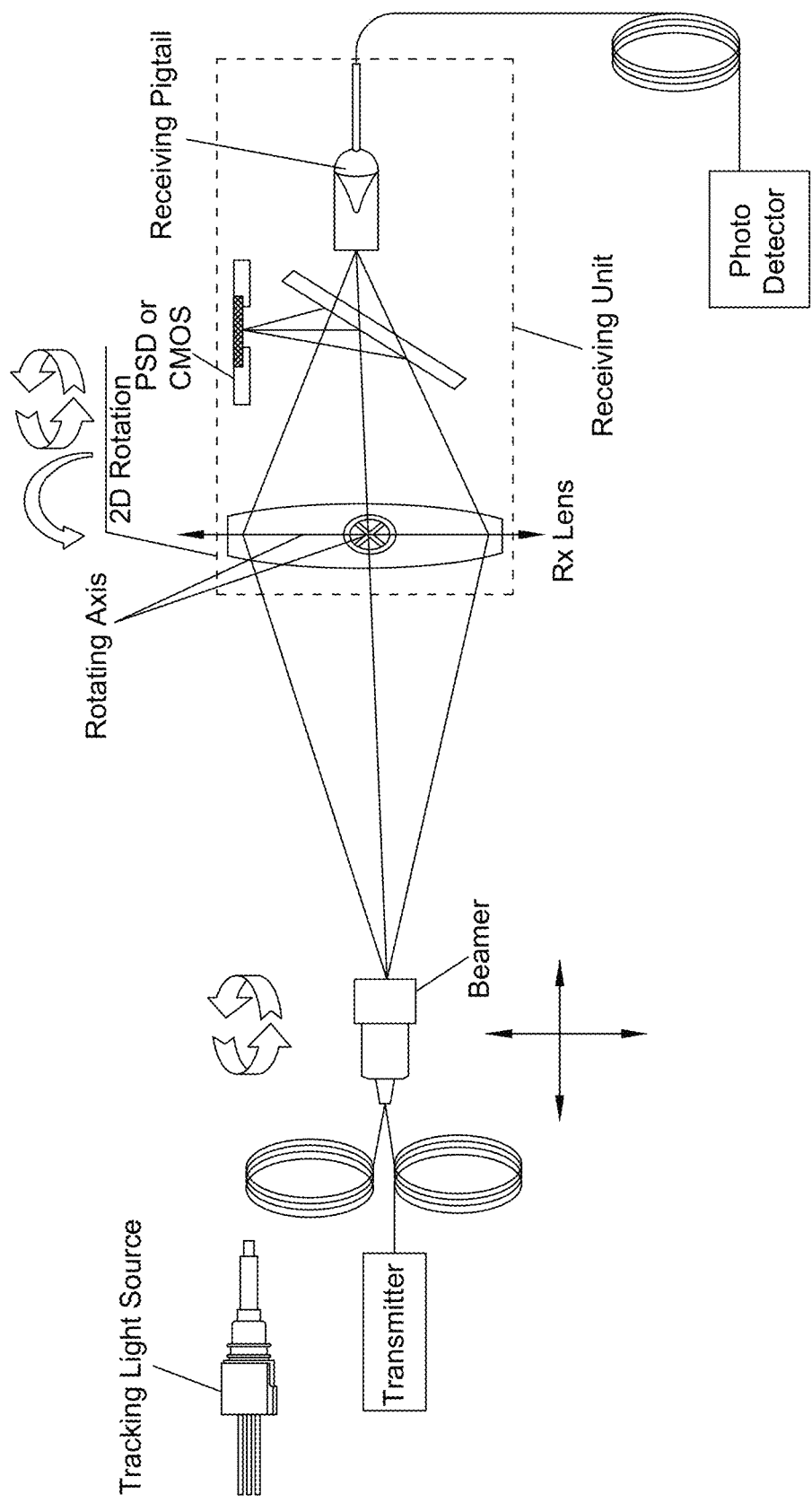
FIG. 3 shows an exemplary opto-mechanical system to communicate data with light.

FIG. 2 shows an exemplary process to optically communicate data while FIG. 3 shows an exemplary optomechanical system to communicate data with light. The system of FIG. 3 has a tracking light source and an optical data transmitter, each coupled to fiber optic cables that enter a beamer to broadcast the light over a predetermined distance to remote vehicles (such as self-driving cars or UAVs) or remote processors. The beamer sends the light to a remote receiving lens (Rx lens) that can perform 2D rotation about a rotating axis. The Rx lens is part of a receiving unit, and the light beam exiting the Rx lens is then separated by a beam splitter. The tracking beam is transmitted to a position-sensitive detector (PSD) or COMS detector. The communication signal beam is transmitted to a receiving fiber pigtail, which in turn is connected to a fiber optic cable that sends light to a photo-detector for receiving and decoding the transmitted data at high speed.

In one embodiment, Position Sensitive Detectors (PSDs) detect 1-D or 2-D position data of incident laser spotlight.

PSDs can track very small positional changes of laser spot over the active area and directly output the position data with high resolution, high-speed response, and high reliability. PSDs are generally divided into two families: segmented PSDs and lateral effect PSDs. Segmented PSDs are common substrate photodiodes divided into either two or four segments for one or two-dimensional measurements, respectively), separated by a gap or dead region, while lateral effect PSDs are continuous single element planar diffused photodiodes with no gaps or dead areas. Both types of PSDs have been widely used in various applications including micro/nano position measuring, surface profiling, vibration detection, tool alignment, targeting and guidance systems, among others. The CMOS position detectors are optoelectronic position sensors that utilize photodiode surface resistance and provide continuous position data, high position resolution, and high-speed response.

The beamer, described here that consists of fiber pigtail, lens or/and prism. The function is to make a properly diverged transmitted beam to enhance the power received by the receiver and reduce receiver alignment tolerance. The transmitter and receiver can be auto-aligned for some short distance applications.

The beamer can be installed on self-driving car or unmanned aerial vehicles (UAVs). Using fiber and cable to connect the beamer to the transmitter and control circuit. There are two signals that come from the beamer. One signal is for tracking to align the receiver unit point to the beamer. Another signal used for communication. The transmitter signal can have one or multiple wavelengths with various modulations. The signal beams can be designed as divergent or paralleled beams, and the beams can be combined or separated.

The receiver unit consists of Rx lens, COMs or position detector, fiber pigtail and photodetector. The PSD or CMOS detector is used to locate the emitted beam. This unit should have a multi-division adjustment capability.

When vehicles reach the Host Station, the beamer sends a command to the receiver unit in the Host station. The receiver unit will scan and calculate the beamer position base on the image of the tracking light on the CMOS position detector. According to the beamer position, the receiver unit will automatically point to the beamer to align the tracking light to the reference point on the position detector. Once signal power reaches a threshold, the transceiver starts normal communication. The communication signal can be used for precision tuning if needed during the alignment process.

For high-speed fiber optic communication, the active area of the photodiode at the receiver side can be small in one implementation. For example, for a 25G transceiver, a typical photoactive area is about 20 microns in diameter and the multi-mode fiber core size is 50 microns. The Rx lens couples transmission signals into a multimode fiber. The signal from the multi-mode fiber is then coupled into the photodiode, so signal power at the receiver side can be higher than the signal power from the Rx lens directly coupled into the photodiode.

The transmitted optical signal may be in the form of laser pulses, laser lines, or laser bars. The optical transmitter includes a clock data recovery (CDR) IC component, a transmitter output stage, a transmitter output amplifier, and a transmit optical power controller. The clock data recovery IC receives an electrical data signal and generates a bit clock signal, a frame clock signal, and a reference clock signal. The transmitter output stage includes a transistor and amplifies the electrical data signal to generate a laser control signal. The laser control signal drives a laser driver IC to generate and output a laser pulse. The laser driver IC outputs a pulse current and a peak power for each laser pulse. The transmit optical power controller outputs a peak power for each laser pulse based on the reference clock signal and the bit clock signal. The transmitter output amplifier amplifies the laser pulse to generate the transmitted optical signal. The optical receiver receives the transmitted optical signal and converts the received optical signal into an electrical signal. The optical receiver includes a photodiode, a received optical power controller, a received optical amplifier, and a photodiode driver. The photo diode is positioned at the focus of a converging lens and is used to capture the optical signal.

The link parameters, including working distance, optical power level, pulse width, pulse frequency, data rate, error rate, data format, system complexity, fiber connection, and so on, can be estimated with existing theoretical formulas and empirical data. To reduce the production cost, the design should be compatible with existing components and industrial standards as much as possible.

One embodiment is designed for short distance free space optical communication system and consist of a transmitter, beamer, tracking system, receiving unit receiver. A shaped beam can be generated by the beamer. The transmitted beam can be enlarged to a properly diverged transmitted beam to enhance the power received by the receiver and reduce receiver alignment tolerance.

A beam expander can be used to enhance the communication range. One embodiment of the beam expander consists of a fiber pigtail, lens, or/and prism. The function is to make a properly diverged transmitted beam to enhance the power received by the receiver and reduce receiver alignment tolerance. The transmitter and receiver can be passively or actively aligned for some short-distance application. The laser can also be integrated with beam expanders together to eliminate fiber connections.

The shaped beam may come from either the transmitter side or the auxiliary alignment system. The signal beam and tracking beam can be shaped by the beamer (beam expander). For example, when a spherical or cylindrical lens is used in front of input fiber, the shaped beam can have a designed divergence angle at the exit of the lens. On the other hand, if a micro-lens array is used in front of the transmitter, the shaped beam will be transmitted through a micro-lens array. For example, the beam shape can be an elliptical shaped or rectangular shaped. An Optical Receiving unit couples the signals from the air into fiber and then from the fiber into the photodiode.

When the system working distance between the car/remote unit and the beamer is short, or the position tolerance of the transmitter at vehicle's side is small, the receiving unit can be designed to have smaller dimensions. Multi-wavelengths by wavelength multiplexer can be supported in the same size optical module.

An alignment sensor captures the tracking light from the air. The function of the alignment sensor is used to determine the location of the receiving unit relative to the transmitting beam. A detection circuit inside the receiving unit calculates the transmitting beam position base on tracking beam focal point on alignment sensor (CMOS), and then sends a command to a stepper motor to rotate the receiving unit and point to the beamer. Once receiving unit points to the beamer, the communication system checks for signal power. If the signal power reaches a threshold for communication, it will start to download/upload the data automatically, otherwise if signal power is too weak, the system will automatically do fine alignment by communication signal until signal power reaches the communication threshold. The lens may be any type of lens known in the art, including, but not limited to, a Fresnel lens, a positive lens, a negative lens, a diffractive lens, a gradient index lens, or a plastic lens. The auxiliary alignment system can be integrated into the optical communication system to share optical elements or designed separately.

To demonstrate the feasibility, practicability, and the ease of implementation, a 10G optical transmitter was used to send a 10G NRZ PRBS (Pseudo-Random Bit Sequence) through the optical components to the optical receiver. The transmitter consists of a CDR (Clock Data Recovery) IC for improving the signal quality and a TOSA (Transmit Optical Sub-Assembly for converting the electrical signal into optical light pulses to be transmitted through the air. The application is not line rate dependent and can work from hundreds of megabits per second to hundreds of gigabits per second.

An avalanche photodiode (APD) receiver is used to capture the light through the air and converts the light back to electrical signals, which can then be fed to a detector circuit for checking if any error occurred during the transmission and if so, the system can request a retransmission in one embodiment. The receiver APD converts the light pulses into electrical signals with amplification. The CDR chip follows to improve the electrical signal by retime and to regenerate the electrical signals. PIN receivers can also be used. The PIN photodiode has an intrinsic (very lightly doped) semiconductor region sandwiched between a p-doped and an n-doped region. The auxiliary alignment system can be integrated into the optical communication system to share optical elements or designed separately.

The system described herein is not limited to any certain data rate nor any form of transmitter and receiver. Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

It should be recognized by those skilled-in-the-art that the present invention can be used in conjunction with any system for which a tailored pattern of uniform light is desired. For example, the method and system for patterning light detailed herein can be used for the generation of desorbed neutral atoms or molecules, or for ionizing atoms or molecules in a spatially-resolved mode for use by a variety of gas, liquid, or solid methods (e.g. mass spectrometry, ion mobility, ion mobility-mass spectrometry, photoaffinity labeling, etc.). All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system, comprising:
a transmitter assembly including:
an optical transmitter to send data and position data using a laser beam;
a beamer coupled to the optical transmitter to shape the laser beam and transmit the laser beam, wherein the optical transmitter comprises a TOSA (Transmit Optical Sub-Assembly) to convert an electrical signal into optical light pulses to be transmitted through the air;
a receiver assembly including:
a lens to focus the laser beam; and
an optical receiver coupled to the lens to receive data, wherein the receiver assembly is moveable to optimize the reception of the laser beam.

2. The system of claim 1, comprising a channel multiplexer coupled to the optical transceiver.

3. The system of claim 2, wherein signals on different wavelengths are transmitted using one optical fiber.

4. The system of claim 1, wherein data traffic from multiple wavelengths is aggregated and shared on one beamer.

5. The system of claim 1, wherein laser beams can be directed with a beam steering deflector with a plurality of output beam angle.

6. The system of claim 1, wherein the optical transmitter is used to send data through the optical components to the optical receiver.

7. The system of claim 1, wherein the optical transmitter consists comprises of a CDR (Clock Data Recovery) module to improve signal quality .

8. The system of claim 1, wherein the optical receiver captures the light through the air and converts the light back to electrical signals.

9. The system of claim 8, comprising a detector circuit for checking any error occurs during the transmission.

10. The system of claim 1, wherein the receiver comprises of an APD (Avalanche Photo Diode) that converts light pulses into electrical signals with amplification.

11. The system of claim 10, comprising a CDR (clock data recovery) circuit coupled to the APD to improve the electrical signal by retime and to regenerate the electrical signals.

12. The system of claim 1, wherein the receiver comprises a PIN receiver.

13. The system of claim 1, comprising an auxiliary tracking and alignment system to share optical elements with optical communication signal.

14. The system of claim 13, wherein the auxiliary alignment system can be automatically turned on or off based on the working distance of the system or the signal beam pointing error to assist an alignment process.

15. The system of claim 1, wherein the beamer broadcasts a light beam over a predetermined distance to one or more remote processors, and wherein the light beam is received by a remote receiving lens and the received light beam is used to perform a 2D rotation of the optical receiver about a rotating axis.

16. The system of claim 15, wherein the one or more remote processors comprise smart car processor or a flying vehicle processors in optical communication with the transmitter assembly using the laser beam.

17. A method to communicate with optical signals, comprising:
sending data at an optical transmitter;
applying a beam expander to make a diverged transmitted beam to enhance the power received by the receiver and reduce receiver alignment tolerance;
focusing the beam with a lens wherein a receiving lens couples the transmission signal into a multimode fiber and then to a photodiode, and wherein the signal power at a receiver side is greater than the signal power from the receiving lens directly coupled into the photodiode.

18. A system, comprising:
a beamer to transmit optical data over air;
a transmitter coupled to the beamer;
a tracking light source coupled to the beamer;
an optical receiver with a lens; and
a motor to rotate the optical receiver;

a transceiver coupled to the photo-detector, wherein the beamer sends a command to the receiver to scan and calculate a beamer position base on an image of tracking light from the tracking light source and based on a beamer position, the optical receiver automatically points to the beamer to align tracking light to a reference point and once signal power reaches a predetermined threshold, the transmitter sends a communication signal; and wherein the beamer optically communicates with a receiver unit including a receiving lens, with the motor moving the optical receiver in a two-dimensional rotating axis, the lens focusing a received tracking light to a position detector, wherein the received communication signal is directed to a photo-detector.

19. The system of claim 18, wherein the communication signal is used for precision alignment.

\* \* \* \* \*